(12) United States Patent
Alameh et al.

(10) Patent No.: US 9,330,666 B2
(45) Date of Patent: May 3, 2016

(54) GESTURE-BASED MESSAGING METHOD, SYSTEM, AND DEVICE

(71) Applicant: Motorola Mobility LLC, Chicago, IL (US)

(72) Inventors: Rachid M Alameh, Crystal Lake, IL (US); Iqbal Arshad, South Barrington, IL (US); Patrick J Cauwels, South Beloit, IL (US); Paul R Steuer, Hawthorn Woods, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 110 days.

(21) Appl. No.: 14/221,785

(22) Filed: Mar. 21, 2014

(65) Prior Publication Data

US 2015/0269936 A1 Sep. 24, 2015

(51) Int. Cl.

| | |
|---|---|
| *G10L 21/00* | (2013.01) |
| *G10L 15/26* | (2006.01) |
| *H04L 12/58* | (2006.01) |
| *G10L 17/00* | (2013.01) |

(52) U.S. Cl.
CPC ............... *G10L 15/26* (2013.01); *H04L 51/32* (2013.01); *G10L 17/00* (2013.01)

(58) Field of Classification Search
CPC ........................... G10L 15/22; G06K 9/00335
See application file for complete search history.

(56) References Cited

U.S. PATENT DOCUMENTS

| | | | | |
|---|---|---|---|---|
| 6,385,586 | B1 * | 5/2002 | Dietz ................... | G06F 17/289 704/251 |
| 8,948,819 | B2 * | 2/2015 | Yun .................... | G06F 3/04883 345/173 |
| 9,190,058 | B2 * | 11/2015 | Klein ................... | G06F 3/167 |
| 9,204,197 | B2 * | 12/2015 | Kim ..................... | H04L 51/32 |
| 2004/0133811 | A1 | 7/2004 | Hiraiwa et al. | |
| 2007/0178950 | A1 | 8/2007 | Lewis et al. | |
| 2011/0187497 | A1 * | 8/2011 | Chin ..................... | H04L 9/32 340/5.54 |
| 2012/0038550 | A1 * | 2/2012 | Lemmey ................ | A63F 13/12 345/156 |
| 2012/0127080 | A1 * | 5/2012 | Kushler ............... | G06F 3/04886 345/168 |
| 2012/0164961 | A1 * | 6/2012 | Gao .................... | H04W 52/241 455/127.1 |
| 2012/0201362 | A1 | 8/2012 | Crossan et al. | |
| 2013/0054695 | A1 * | 2/2013 | Holman ................ | G09B 19/00 709/204 |
| 2013/0151603 | A1 * | 6/2013 | Lobb ...................... | A63F 13/12 709/204 |
| 2013/0267204 | A1 * | 10/2013 | Schultz ................ | G06F 21/32 455/411 |
| 2014/0026201 | A1 * | 1/2014 | Srinivasan ............ | G06Q 50/01 726/7 |
| 2014/0049417 | A1 * | 2/2014 | Abdurrahman ........ | G08C 19/00 341/176 |
| 2014/0051402 | A1 * | 2/2014 | Qureshi .............. | H04M 3/5307 455/413 |
| 2014/0058584 | A1 * | 2/2014 | Weng ........................ | G06F 7/00 701/1 |
| 2014/0085460 | A1 * | 3/2014 | Park ....................... | G06F 21/84 348/135 |
| 2014/0108566 | A1 * | 4/2014 | Vanscoyk ............. | G06Q 50/01 709/206 |
| 2014/0164506 | A1 * | 6/2014 | Tesch ..................... | G06Q 50/01 709/204 |
| 2014/0214628 | A1 * | 7/2014 | Argue ................ | G06Q 30/0643 705/27.1 |
| 2014/0344687 | A1 * | 11/2014 | Durham ................ | G06F 1/1686 715/716 |
| 2015/0012426 | A1 * | 1/2015 | Purves ............... | G06Q 30/0623 705/41 |
| 2015/0026572 | A1 * | 1/2015 | Cahill ................... | G06F 3/0488 715/716 |
| 2015/0040035 | A1 * | 2/2015 | Neelakant .............. | H04L 51/32 715/753 |
| 2015/0052430 | A1 * | 2/2015 | Dwan ................. | G06F 3/04883 715/702 |
| 2015/0084859 | A1 * | 3/2015 | Itzhaik .................... | G06F 3/017 345/156 |
| 2015/0127541 | A1 * | 5/2015 | Just ......................... | G06Q 20/10 705/44 |
| 2015/0177866 | A1 * | 6/2015 | Hwang ................... | G06F 3/042 345/175 |

\* cited by examiner

*Primary Examiner* — Brian Albertalli
(74) *Attorney, Agent, or Firm* — Shumaker & Sieffert, P.A.

(57) ABSTRACT

This disclosure is generally directed to a method on a gesture-based messaging device ("messaging device"). According to various implementations, the messaging device detects a user's gesture (e.g., arm gesture, hand gesture, or finger gesture) using, for example, Electromyography or EMG. The messaging device may be implemented as a wearable device, such as a ring, wristband (e.g., a wristwatch), or pair of glasses (e.g., Google Glass™). The messaging device attempts to authenticate the user. If the messaging device authenticates the user and recognizes the gesture as indicating that a social media message is to be dictated, then the messaging device enters a social media mode, during which it listens for and receives an input of a spoken message from the user, converts the spoken message to a text message, and transmits the text message to a social media entity (e.g., Twitter®, Facebook®, or Tumblr®).

20 Claims, 7 Drawing Sheets

GESTURE-BASED MESSAGING METHOD, SYSTEM, AND DEVICE

TECHNICAL FIELD

The present disclosure is related generally to wireless communication and, more particularly, to wireless communication in the context of gesture-based computing.

BACKGROUND

Gesture-based computing has been used for several years in the home video game industry, but is now becoming more widespread in the mobile device area. Allowing users to initiate actions without the need to make physical contact with a mobile device opens up multiple possibilities for new forms of human-device interaction.

DRAWINGS

While the appended claims set forth the features of the present techniques with particularity, these techniques, together with their objects and advantages, may be best understood from the following detailed description taken in conjunction with the accompanying drawings of which:

DESCRIPTION

This disclosure is generally directed to a method on a gesture-based messaging device ("messaging device"). According to various embodiments, the messaging device detects a user's gesture (e.g., arm gesture, hand gesture, or finger gesture) with the messaging device using, for example, Electromyography or EMG. In some embodiments, the messaging device detects gestures that occur on the messaging device using, for example, a touch sensor; an infrared sensor, which can detect gestures in three dimensions above the computing device 304; an ultrasonic sensor; and an imager sensor (e.g., a camera). The messaging device may be implemented as a wearable device, such as a ring, wristband (e.g., a wristwatch), or pair of glasses (e.g., Google Glass™). The messaging device attempts to authenticate the user. If the messaging device authenticates the user and recognizes the gesture as indicating that a social media message is to be dictated, then the messaging device enters a social media mode, during which it listens for and receives an input of a spoken message from a user, converts the spoken message to a text message, and transmits the text message to a social media entity (e.g., Twitter®, Facebook®, or Tumblr®). The messaging device may also attempt authenticate the user based on voice recognition. In such case, the messaging device only enters the social media mode if the messaging device successfully authenticates the user based on voice recognition (in addition to gesture recognition). In some embodiments, the device does not send the message unless it receives a "send" confirmation, either spoken or by gesture.

According to an embodiment, the messaging device operates as part of a system. In this embodiment, the messaging device attempts to locate the nearest computing device (e.g., a smartphone, tablet computer, or personal computer) with which it is already paired, or with which it can pair using, for example, ad hoc pairing or proximity pairing. The messaging device establishes wireless connection with the located computing device and determines the signal strength of the wireless connection. If the signal strength is above a threshold value (indicating that the computing device is close to the messaging device), then the messaging device informs the computing device (via the wireless connection) that the computing device is to display the text message. The computing device may, in some embodiments, translate the text message from one language to another. The computing device can determine the target language based on the location of the computing device (as determined, for example, by a global positioning signal).

Figure 1:
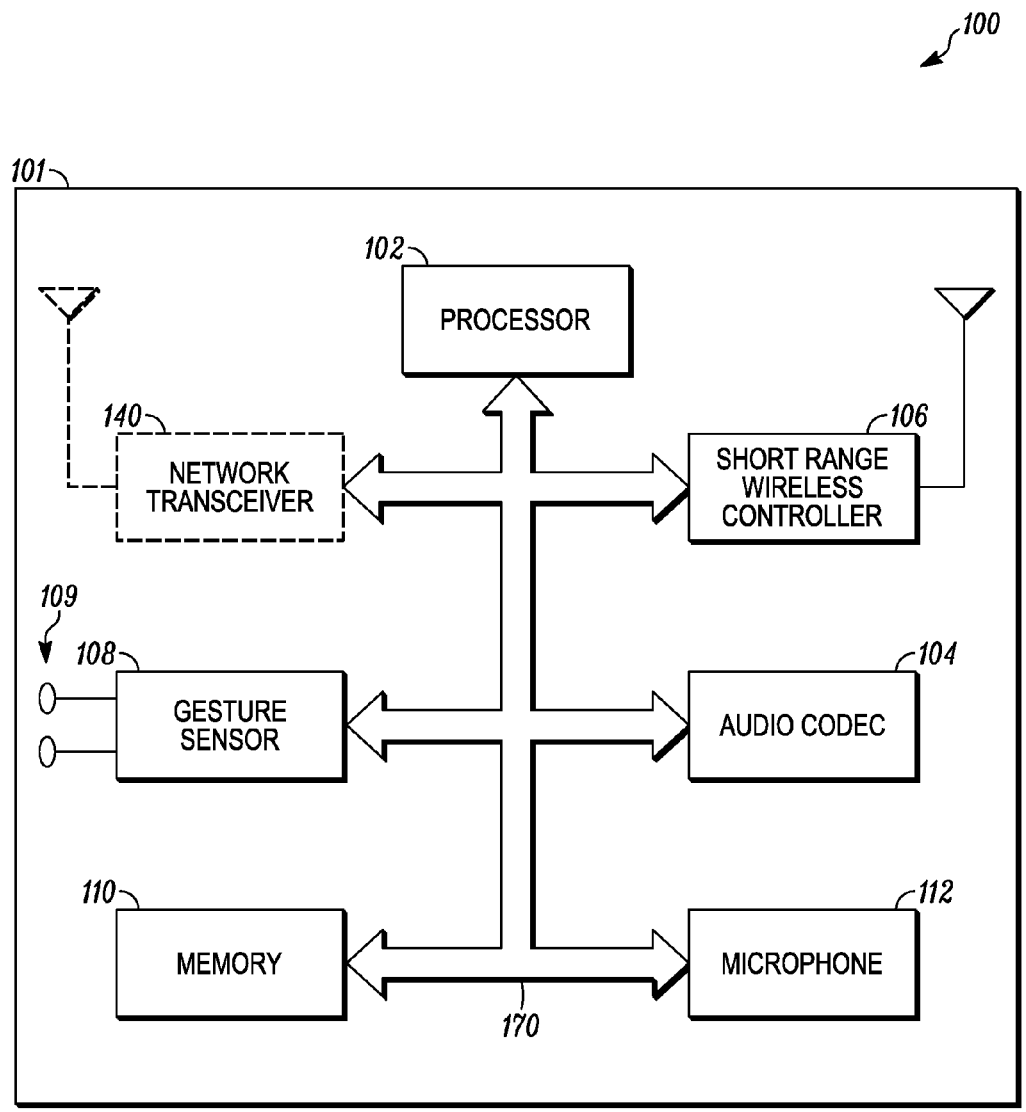
FIG. 1 is a gesture-based messaging device according to an embodiment.

FIG. 1 illustrates a gesture-based messaging device 100 according to an embodiment. The messaging device 100 is capable of converting movements of the user's arm, hand, or fingers into electrical signals (e.g., using EMG). The messaging device 100 is also capable of communicating with other devices via a short range communication technology such as Bluetooth®, low-energy Bluetooth® ("BLE"), or Near Field Communication ("NFC"). In some embodiments, the messaging device 100 is capable of communicating via wireless local area network ("WLAN") or via cellular network.

Continuing with FIG. 1, an embodiment of the gesture-based messaging device 100 includes a housing 101. The housing 101 may take a variety of forms, including a ring, wrist device (e.g., a wristwatch), and a pair of glasses. Within the housing 101 is a processor 102. Several components are communicatively linked to the processor 102, including an audio codec 104, a short-rage wireless controller 106 (e.g., a Bluetooth® controller, BLE controller, or an NFC controller), a gesture sensor 108, and a memory 110. In one embodiment, the gesture sensor 108 is an EMG circuit and is coupled to electrodes 109. Electrodes 109 are disposed proximate to the outer surface of the housing 101 such that they can make contact with a user's skin if the user wears the messaging device 100. The short-range wireless controller 106 includes a transceiver.

During operation of the messaging device 100, the short-range wireless controller 106 receives data from the processor 102 and transmits Radio Frequency ("RF") signals representing the data via a transceiver and an antenna. Similarly, the short-range wireless controller 106 receives RF signals (via the transceiver and the antenna), converts the signals into the appropriately formatted data, and provides the data to the processor 102.

The messaging device 100 further includes a microphone 112 (e.g., a directional microphone) communicatively linked to the audio codec 104. The microphone 112 senses an input of a spoken message, converts the spoken message into audio signals, and provides the audio signals to the audio codec 104. The audio codec 104 decodes the audio signals and provides the decoded audio signals to the processor 102. The processor 102 executes a speech-to-text engine, which is stored in the memory 110, in order to convert the spoken message into a text message. The processor 102 transmits the text message via the short range wireless controller 106 to another entity such as a smartphone, tablet computer, or component of a home network. In some implementations, the processor 102 transmits the text message via WLAN or cellular network using a network transceiver 140. The messaging device 100 further includes a battery, which may be an inductively-rechargeable button cell. The elements of FIG. 1 are communicatively linked to one another via one or more data pathways 170. Possible implementations of the data pathways 170 include wires and conductive pathways on a microchip. Possible implementations of the processor 102 include a microprocessor and a controller.

Figure 2:
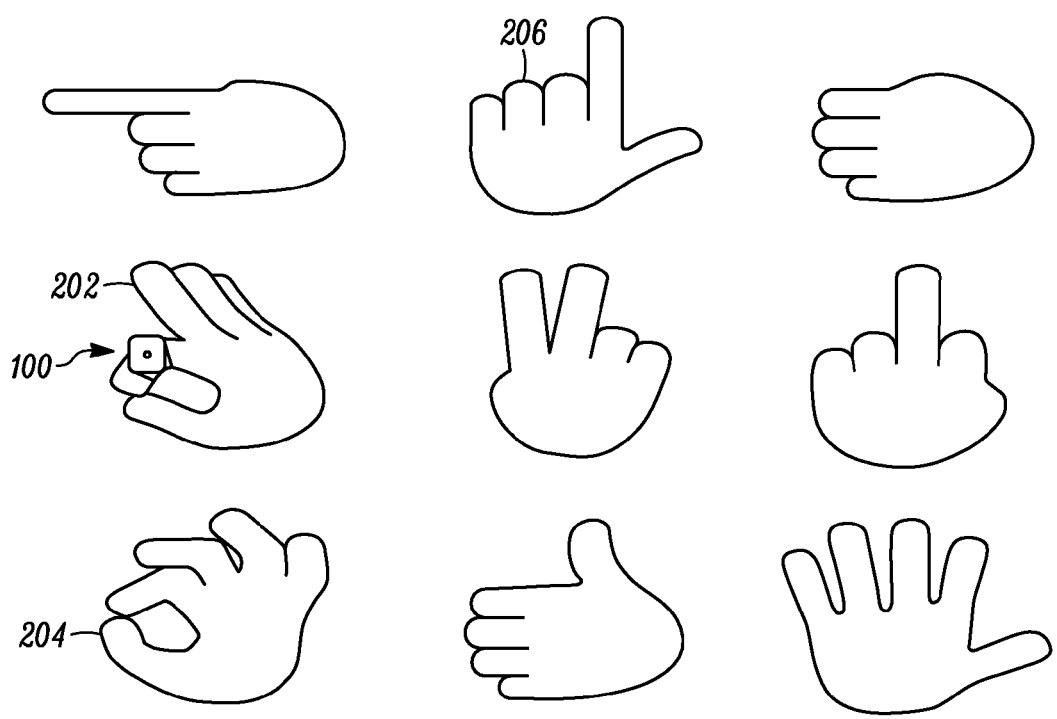
FIG. 2 shows different gestures that may be used.

Turning to FIG. 2, there are a variety of gestures that may be used with the embodiments described herein. For example, if the messaging device 100 is implemented as a ring, different finger positions (e.g., finger extended, thumb open or closed) may represent different actions. Gesture 202 could mean "Enter social media mode and prepare to listen for a Twitter® message," while gesture 204 could mean "Enter social media mode and prepare to listen for a Tumblr® message." Gesture 206 could mean "send the text message." Thus, a user could speak one message to the messaging device 100, use one gesture to send it to one social media entity, then use another gesture to send the text message to another social media entity. If confirmation is not used, the messaging device 100 may send the message to the social media entity as soon as the user finishes speaking it—i.e., without further prompting.

Figure 3:
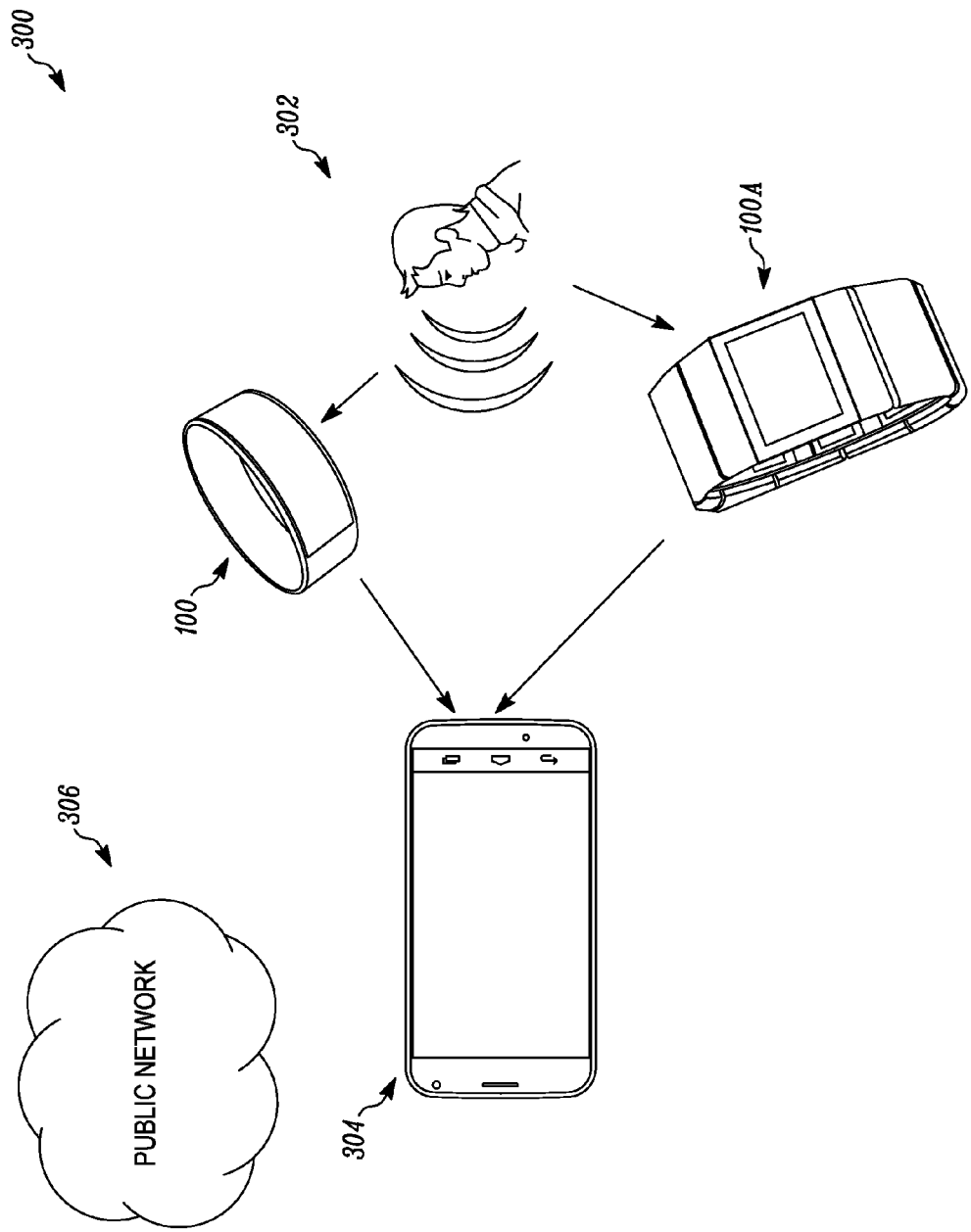
FIG. 3 shows a gesture-based messaging system according to an embodiment.

Turning to FIG. 3, a gesture-based messaging system 300 according to an embodiment includes the gesture-based messaging device 100 of FIG. 1. The messaging device 100 is worn by a user 302 and is communicatively linked to a computing device 304 via short-range wireless communication (using the short-range wireless controller 106 of FIG. 1). Possible implementations of the computing device 304 include a smartphone, a tablet computer, and a component of a home network. As previously discussed, there are many possible implementations of the messaging device 100, including a wristband 100A. In some embodiments, the user 302 wears multiple devices, such as a ring and a wristwatch. As will be described in more detail below, the messaging device 100 and the computing device 304 may be pre-paired or may establish communication using, for example, ad hoc pairing or proximity pairing. In some embodiments, the computing device 100 performs voice authentication and language translation, and does by itself or by contacting the appropriate service on a public network 306. The computing device 100 may determine the target language for translation based on its location as indicated, for example, by global positioning system signals.

Figure 4:
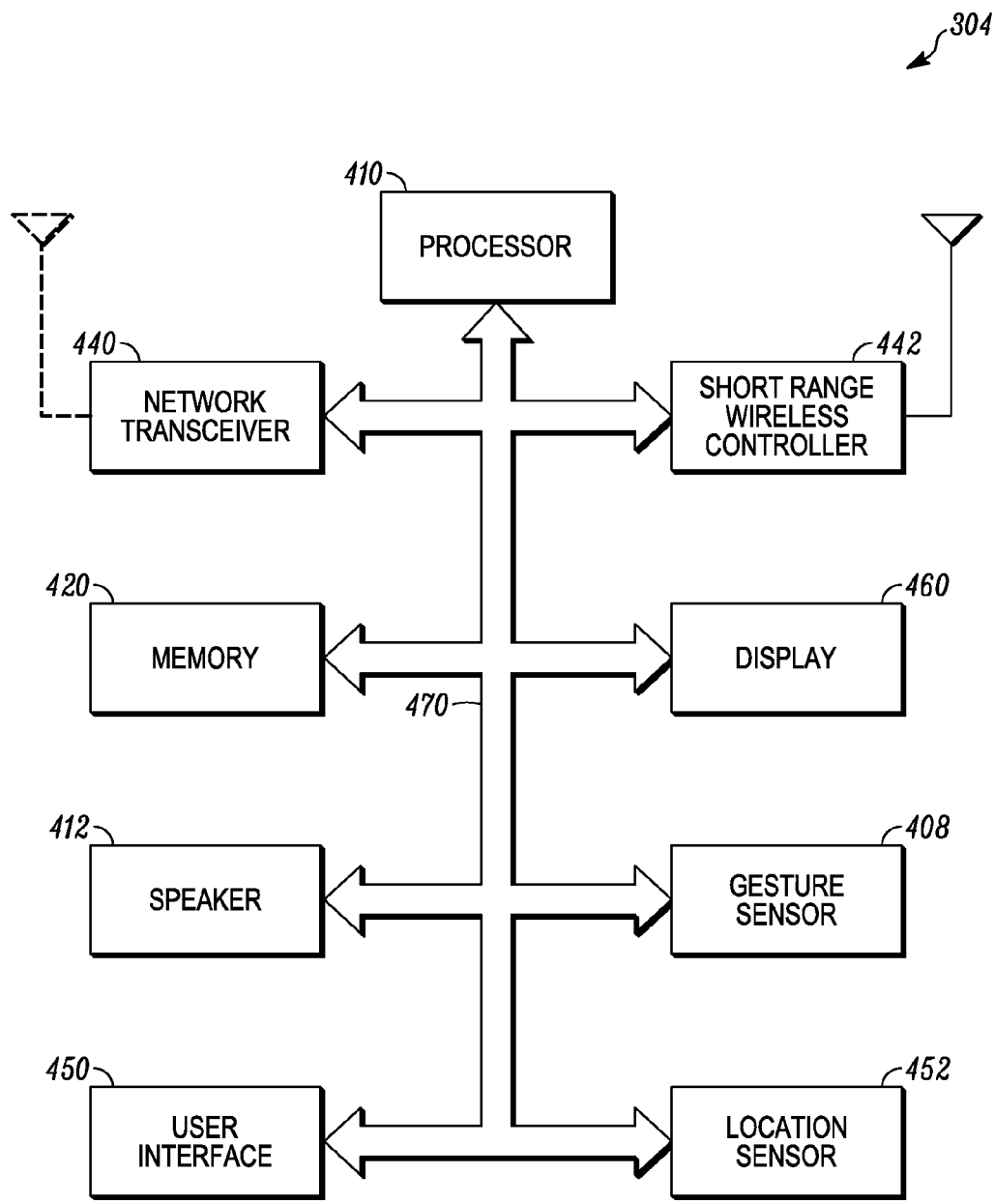
FIG. 4 shows a computing device according to an embodiment.

Turning to FIG. 4, an embodiment of the computing device 304 includes a processor 410, a memory 420 (which can be implemented as volatile memory or non-volatile memory), a network transceiver 440 (e.g., an IEEE 802.11x transceiver, a wired cable network transceiver, or a cellular communication transceiver), a short range wireless controller 442 (e.g., a Bluetooth® controller, such as a BLE controller, or an NFC controller), a display 460, a speaker 412, a user interface 450, and a location sensor 452 (e.g., a global positioning system sensor), and one or more antennas. Each of these elements is communicatively linked to one another via one or more data pathways 470. In some embodiments, the computing device 304 includes a gesture sensor 408, which is capable of sensing gestures of a user. Possible implementations of the gesture sensor 408 include an EMG sensor; a touch sensor, which can detect gestures on the display 460; an infrared sensor, which can detect gestures in three dimensions above the computing device 304; an ultrasonic sensor; and an imager sensor (e.g., a camera). The location sensor 452 senses the location of the computing device 304 on the Earth.

Possible implementations of the data pathways 470 include wires and conductive pathways on a microchip. Possible implementations of the processor 410 include a microprocessor and a computer.

During operation of the computing device 304, the network transceiver 440 receives data from the processor 410 and transmits RF signals representing the data via a wired connection or, if wireless, via an antenna. Similarly, the transceiver 440 receives RF signals (via an antenna if wireless), converts the signals into the appropriately-formatted data, and provides the data to the processor 410. The short-range wireless controller 442 receives data from the processor 410 and transmits RF signals representing the data via the antenna. The short-range wireless controller 442 receives RF signals via an antenna, converts the signals into the appropriately formatted data, and provides the data to the processor 410. In some cases (such as when reading back text messages), the processor transmits data to the speaker 412, which generates sound, such as an artificial voice, based on the data.

The processor 410 retrieves instructions and data from the memory 420 and, using the instructions and data, provides outgoing data to, or receives incoming data from the network transceiver 440 and the short-range wireless controller 442.

Figure 5:
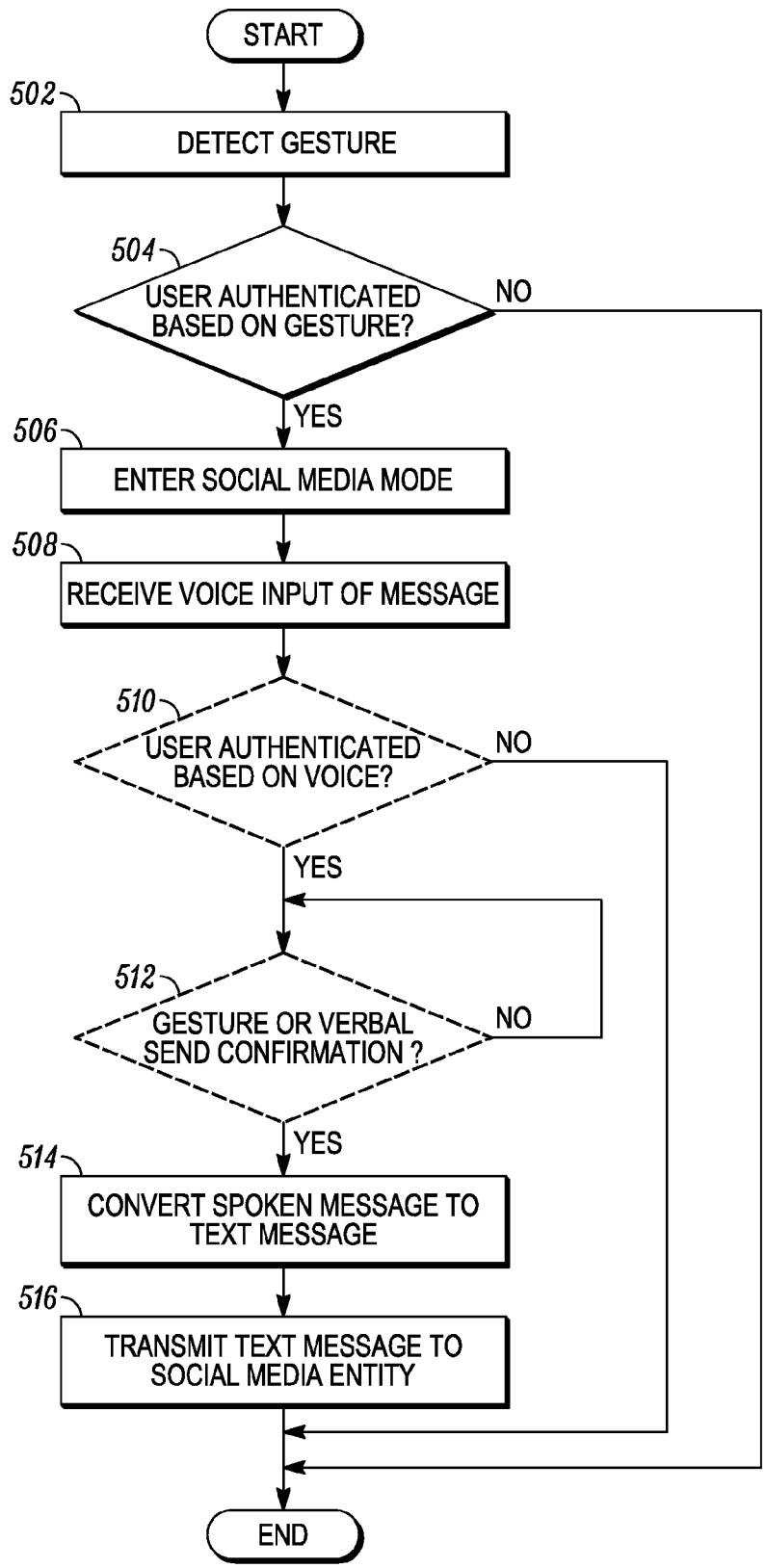
FIGS. 5 and 6 are flowcharts that illustrate the operation of different embodiments.

Turning to FIG. 5, a flowchart describes a process that the gesture-based messaging device 100 carries out in an embodiment. In this scenario, it will be assumed that the user makes a gesture (e.g., a hand gesture or a finger gesture) that maps to sending a message to a social media entity. At block 502, the messaging device 100 detects the gesture. At block 504, the messaging device 100 attempts to authenticate the user based on the gesture. If the messaging device 100 cannot authenticate the user, then the procedure of FIG. 5 ends. If the messaging device 100 successfully authenticates the user, it enters a social media mode—i.e., the messaging device 100 enables the social media voice entry feature—at block 506. At block 508, the messaging device 100 receives an input of a spoken message. At block 510 (if voice authentication is used), the messaging device 100 attempts to authenticate the user based on the user's voice. In doing so, the messaging device 100 may contact an external server (such as a web-based service) to help perform the authentication. If the authentication fails, then the procedure of FIG. 5 ends. If the user is successfully authenticated, then at block 512 (if the confirmation feature is used), the messaging device 100 waits for either a gesture or voice confirmation (whichever the user has set up) before sending the message. An example of a gesture confirmation is the user flicking his wrist. An example of a voice confirmation is the user speaking "send." Once the messaging device 100 has received confirmation from the user, it converts the spoken message into a text message at block 514. At block 516, the messaging device 100 sends the text message to a social media entity (e.g., via WLAN, via cellular communication, or via a smartphone using BLE).

Figure 6:
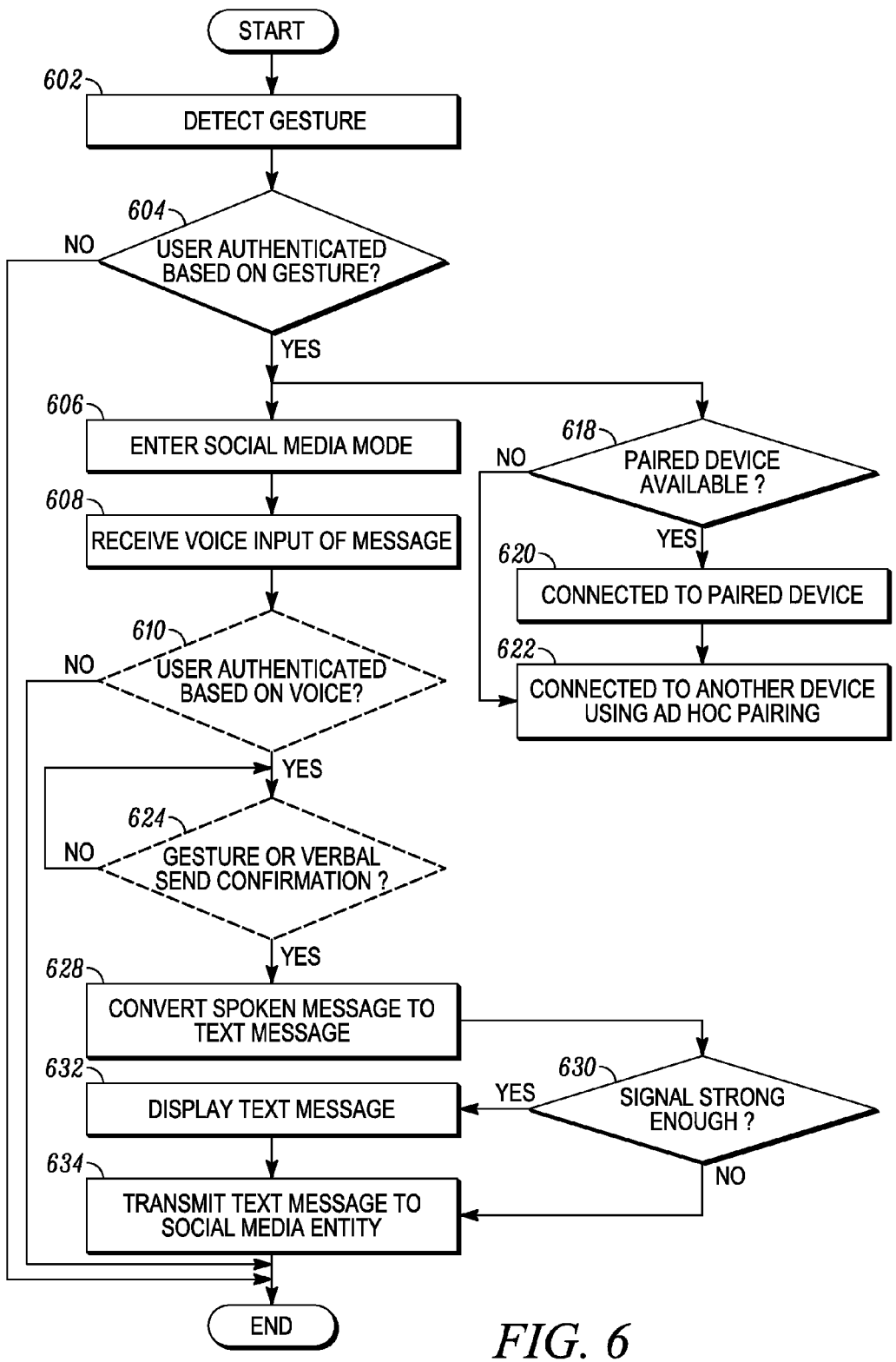

Turning to FIG. 6, a flowchart describes how the gesture-based messaging system 300 (FIG. 3) operates according to an embodiment. As in the case of FIG. 5, it will be assumed for FIG. 6 that the user makes a gesture (e.g., a hand gesture, finger gesture, or a touch gesture) that translates to sending a message to a social media entity. At block 602, the messaging device 100 detects the gesture. At block 604, the messaging device 100 attempts to authenticate the user based on the gesture. If the messaging device 100 cannot authenticate the user, then the procedure of FIG. 6 ends. If the messaging device 100 successfully authenticates the user, it enters a social media mode—i.e., the messaging device 100 enables the social media voice entry feature—at block 606.

In parallel with block 606 (e.g., in a background process), at block 608, the messaging device 100 determines whether any computing device with which it is already paired is available (e.g., within range and accessible by BLE). If there is such a computing device available, the messaging device 100 connects with that computing device at block 620. If no paired device is available, then the messaging device 100 looks for and connects with another computing device using a pairing procedure, such as ad hoc pairing or proximity pairing (which may be ad hoc). If proximity pairing is used, then, as soon as the user carries the messaging device 100 within a certain distance from the computing device 304 (e.g., within five feet), then the messaging device 100 pairs with the computing device 304.

Figure 7:
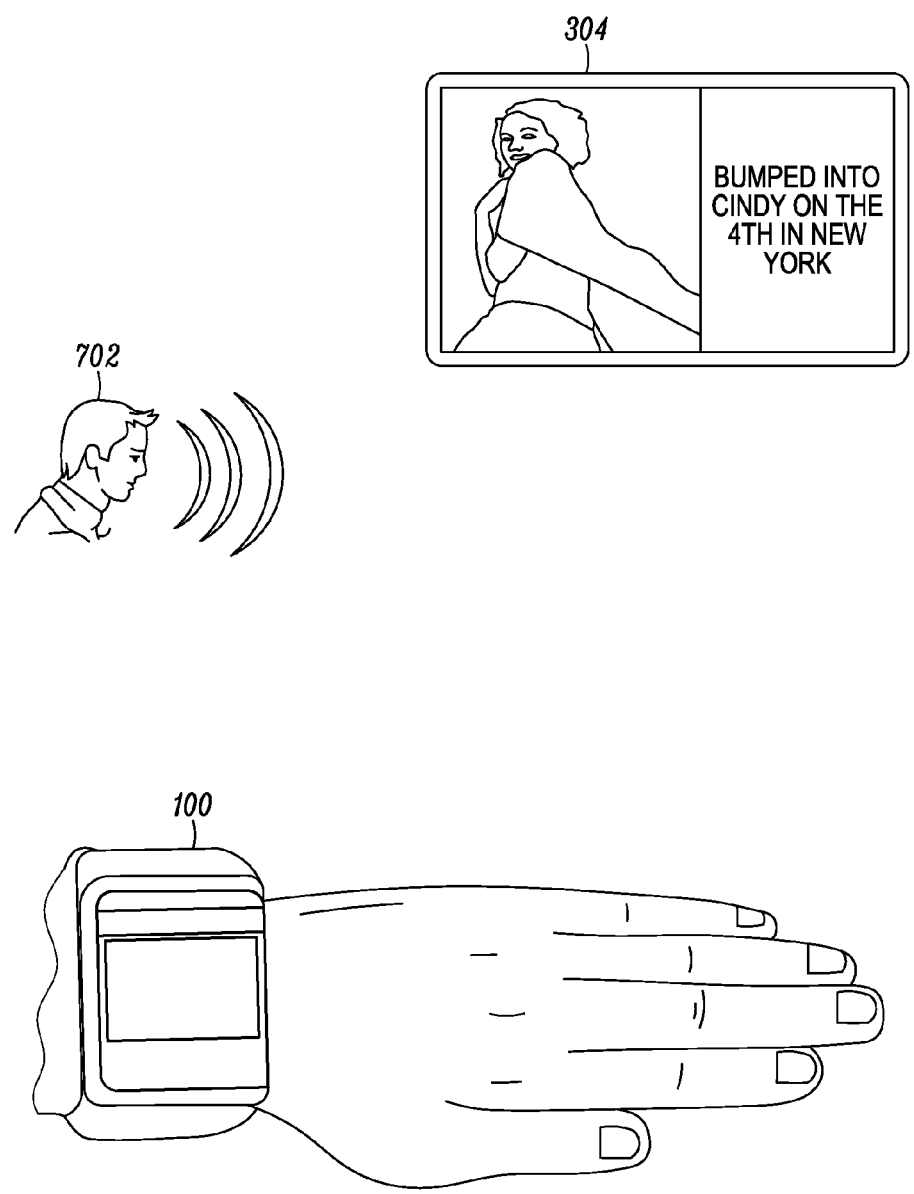
FIG. 7 illustrates a use case for an embodiment.

At block 608, the messaging device 100 receives a voice input of a message. Referring to FIG. 7, for example, a user 702 speaks the message "Bumped into Cindy on the 4th in New York." The messaging device 100 transmits this message to the computing device 304. At block 610 (if voice authentication is used), the computing device 304 attempts to authenticate the user's voice. In doing so, the computing device 304 may contact an external server (such as a web-based service) to help perform the authentication. If authentication fails, then the procedure of FIG. 6 ends. If the user is successfully authenticated, and if the confirmation feature is used, at block 624, the messaging device 100 waits for either a gesture or voice confirmation (whichever the user has set up) before sending the message. Once the messaging device 100 receives the confirmation, it converts the spoken message into a text message at block 628. At block 630, the messaging device 100 determines whether the signal it receives from the computing device 304 is strong enough to indicate that the computing device is close to the user (e.g., by comparing the signal strength to a predetermined threshold). If yes, then the messaging device 100 informs the computing device 304 that it is to display the text message on the display 460 (FIG. 4) at block 632. This allows the user to review the message. In the example of FIG. 7, the computing device 304 displays both the text of the message and the photo of the intended recipient. The computing device 304 then transmits the text message to the social media entity at block 634. If the messaging device 100 determines that the signal is not strong enough (block 630), the messaging device 100 informs the computing device 304 that it is to send the text message to the social media entity (block 634)—without displaying the message in this case. In some embodiments, the computing device 304 translates the text message into the appropriate language as determined, for example, by its location. The computing device 304 can determine its location by using its location sensor 452.

In an alternate embodiment, blocks 514 and 632 of FIGS. 5 and 6 can be implemented by the computing device 304 "speaking" (using a text-to-speech function) the text message.

It should be understood that the steps of the flowcharts of FIGS. 5 and 6 can be reordered. For example, the messaging device 100 may convert the spoken message to a text message prior to waiting for confirmation (e.g., blocks 514 and 512 of FIG. 5 may be switched).

It can be seen from the foregoing that a gesture-based messaging method and system have been described. It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the have been described with reference to the figures, it will be understood by those of ordinary skill in the art that various changes in form and details may be made therein without departing from their spirit and scope of as defined by the following claims.

What is claimed is:

1. A method comprising:
    detecting, by a wearable gesture-based messaging device being worn by a user, a gesture of the user, wherein the gesture is one of a plurality of gestures detectable by the gesture-based messaging device, wherein each gesture from the plurality of gestures corresponds to a different social media entity of a plurality of social media entities, and wherein the gesture includes one or more of a hand gesture, a finger gesture, or a touch gesture;
    determining, by the wearable gesture-based messaging device and based on the gesture of the user, a social media entity;
    entering, by the wearable gesture-based messaging device, a social media mode associated with the social media entity; and
    while in the social media mode,
        receiving, by the wearable gesture-based messaging device, an input of a spoken message;
        converting, by the wearable gesture-based messaging device, the spoken message to a text message; and
        transmitting, by the wearable gesture-based messaging device, the text message to the social media entity.

2. The method of claim 1, further comprising:
    determining, by the wearable gesture-based messaging device and based on the gesture, whether the user wearing the wearable gesture-based messaging device is authenticated,
    wherein transmitting the text message to the social media entity is in response to determining that the user is authenticated.

3. The method of claim 1, further comprising:
    determining, by the wearable gesture-based messaging device and based on the gesture, whether the user wearing the wearable gesture-based messaging device is authenticated; and
    determining, by the wearable gesture-based messaging device and based on the input of the spoken message, whether the user is authenticated,
    wherein transmitting the text message to the social media entity is in response to determining that if the user is authenticated based on the gesture and the input of the spoken message.

4. The method of claim 1, wherein the gesture is a first gesture, the method further comprising:
    detecting, by the wearable gesture-based messaging device, a second gesture indicating that the text message should be sent,
    wherein transmitting the text message to the social media entity is in response to detecting the second gesture.

5. The method of claim 1, further comprising:
    receiving, by the wearable gesture-based messaging device, a voice input of a send command;
    wherein transmitting the text message to the social media entity is in response to receiving the voice input of the send command.

6. The method of claim wherein the gesture is a first gesture, the method further comprising:
    detecting, by the wearable gesture-based messaging device, a second gesture of the plurality of gestures;
    determining, by the wearable gesture-based messaging device and based on the second gesture, a different social media entity;
    entering, by the wearable gesture-based messaging device, a social media mode associated with the different social media entity; and
    while in the social media mode associated with the different social media entity,
        receiving, by the wearable gesture-based messaging device, an input of a second spoken message;
        converting, by the wearable gesture-based messaging device, the second spoken message to a second text message; and
        transmitting, by the wearable gesture-based messaging device, the second text message to the different social media entity.

7. The method of claim 1, wherein the gesture is detected via Electromyography.

8. The method of claim 1, wherein the gesture is detected via a device selected from the group consisting of a touch sensor, an infrared sensor, an ultrasonic sensor, and an imager.

9. A system comprising:
a wearable gesture-based messaging device;
a computing device,
wherein the wearable gesture-based messaging device:
establishes a wireless connection with the computing device;
detects a gesture of a user, wherein the gesture is one of a plurality of gestures detectable by the gesture-based messaging device, wherein each gesture from the plurality of gestures corresponds to a different social media entity of a plurality of social media entities, and wherein the gesture includes one or more of a hand gesture, a finger gesture, or a touch gesture;
determines, based on the gesture of the user, a social media entity;
enters a social media mode associated with the social media entity;
while in the social media mode:
receives an input of a spoken message; and
converts the spoken message to a text message; and
transmits, to the computing device via the wireless connection, the text message, and
wherein the computing device transmits the text message to the social media entity.

10. The system of claim 9, wherein the computing device comprises a display that displays the text message on the display.

11. The system of claim 9, wherein the wearable gesture-based messaging device pairs with the computing device using ad hoc pairing.

12. The system of claim 9, wherein the wearable gesture-based messaging device pairs with the computing device using proximity pairing.

13. The system of claim 9 wherein:
the computing device comprises a display; and
the wearable gesture-based messaging device, if the strength of the wireless connection is above a threshold value, informs the computing device that the computing device is to display the text message on the display.

14. The system of claim 9, wherein:
the computing device comprises a speaker; and
the computing device converts the text message to a voice message, and plays the voice message over the speaker.

15. The system of claim 9, wherein the computing device:
determines, based on the gesture, whether the user is authenticated; and
transmits the text version of the message to the social media entity in response to determining that the user is authenticated.

16. The system of claim 9, wherein the computing device:
determining, based on the gesture and the input of the spoken message, whether the user is authenticated; and
transmits the text message to the social media entity in response to determining that the user is authenticated.

17. The system of claim 9, wherein:
the wearable gesture-based messaging device detects a second gesture indicating that the text message should be sent; and
the computing device transmits the text message to a social media entity in response to the wearable gesture-based messaging device detecting the second gesture.

18. The system of claim 9, wherein:
the wearable gesture-based messaging device receives a voice input of a send command; and
the computing device transmits the text message to a social media entity in response to the wearable gesture-based messaging device receiving the voice input of the send command.

19. A wearable gesture-based messaging device comprising:
a microphone;
a processor;
a short-range wireless controller electrically coupled to the processor;
an antenna electrically coupled to the short-range wireless controller;
an electromyography circuit electrically coupled to the processor;
a housing that houses the microphone, the processor, the short-range wireless controller, the antenna, and the electromyography circuit; and
electrodes electrically coupled to the electromyography circuit and disposed proximate to the housing such that the electrodes make contact with a user's skin when the user wears the wearable gesture-based messaging device,
wherein the electromyography circuit is configured to detect a gesture of the user of the wearable gesture-based messaging device via the electrodes, wherein the gesture is one of a plurality of gestures detectable by the gesture-based messaging device, wherein each gesture from the plurality of gestures corresponds to a different social media entity of a plurality of social media entities, and wherein the gesture includes one or more of a hand gesture, finger gesture, or a touch gesture;
wherein the processor:
determines, based on the gesture of the user, a social media entity;
enters a social media mode associated with the social media entity; and
while in the social media mode,
receives, via the microphone, an input of a spoken message;
converts the spoken message from a spoken message to a text message; and
transmits, via the short-range wireless controller, the text message to the social media entity.

20. The wearable gesture-based messaging device of claim 19, further comprising a location sensor, wherein the processor translates the text message from a first language to a second language based on the location of the computing device as identified by the location sensor.

* * * * *